United States Patent [19]
Wahlmark

[11] 3,877,251
[45] Apr. 15, 1975

[54] UNIVERSAL JOINT SYSTEM

[75] Inventor: Gunnar A. Wahlmark, Dixon, Ill.

[73] Assignee: Wahlmark Systems, Inc., Chicago, Ill.

[22] Filed: June 15, 1973

[21] Appl. No.: 370,408

[52] U.S. Cl. ............................ 64/21; 64/8; 308/176
[51] Int. Cl. .............................................. F16d 3/30
[58] Field of Search ........... 64/21, 8, 17 A; 308/176

[56] References Cited
UNITED STATES PATENTS

| | | | |
|---|---|---|---|
| 2,910,845 | 11/1957 | Wahlmark | 64/21 |
| 3,125,870 | 3/1964 | Orgin | 64/8 |
| 3,318,108 | 5/1967 | Cadiov | 64/8 |
| 3,357,210 | 12/1967 | Dean | 64/21 |
| 3,490,251 | 1/1970 | Roethlisberger | 64/8 |
| 3,613,396 | 10/1971 | Devard et al. | 64/21 |
| 3,792,598 | 2/1974 | Orgin | 64/21 |

Primary Examiner—Samuel Scott
Assistant Examiner—Randall Heald
Attorney, Agent, or Firm—Lee & Smith

[57] ABSTRACT

A constant velocity universal joint of the three-roller type employing a trunnion member carrying three drive rollers at a controlled torque arm distance from the axis of the member and drivingly disposed in respective drive tracks formed in a track member. The drive rollers are rotatably and axially shiftably carried on respective trunnions of the trunnion member by means of improved two-way antifriction bearings, and the torque arm distance of the drive rollers is controlled by the configuration of the drive tracks. In one embodiment employing relative axial travel between the trunnion member and the track member the drive tracks are formed as arcs of a circle having a radius larger than the torque arm distance of the drive rollers, with the radius and torque arm having an optimum ratio range for most efficient joint operation. In another embodiment relative axial travel between the members is positively prevented by a centering device carried by the track member and operatively engaging the drive rollers carried by the trunnion member without interfering with the relative weaving of the axes of the members as the members rotate in driving relation with their axes angularly disposed.

10 Claims, 9 Drawing Figures

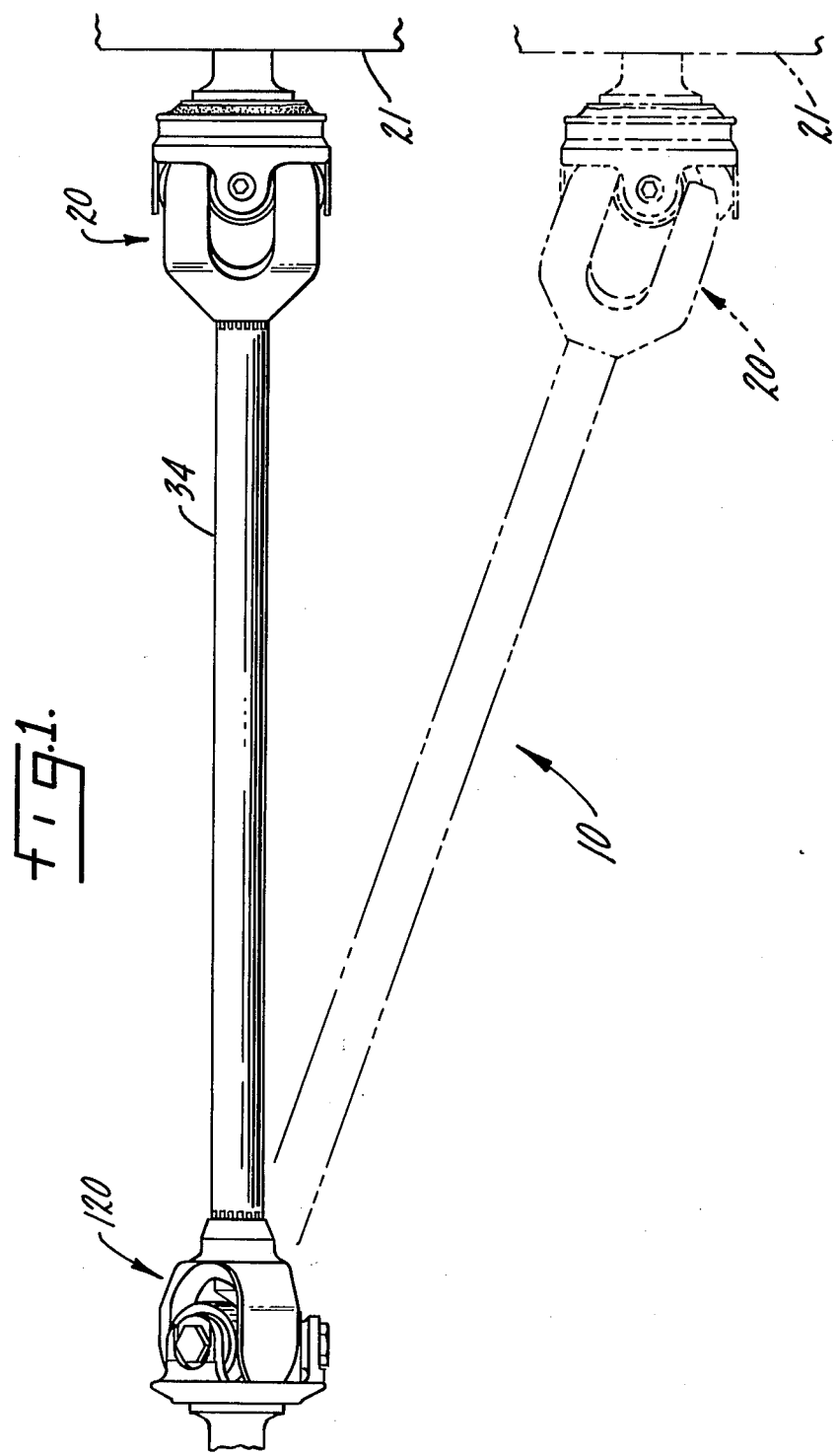

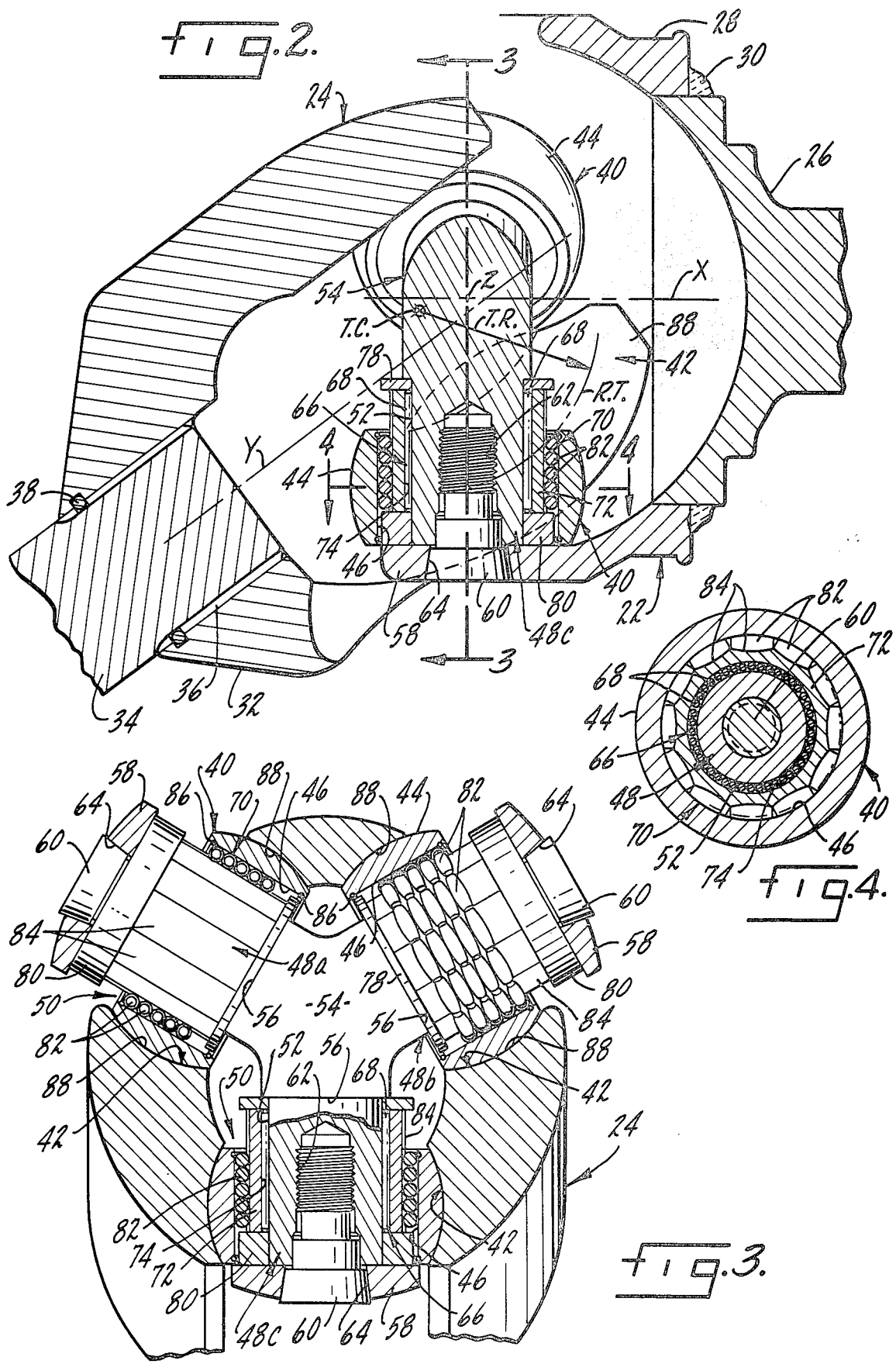

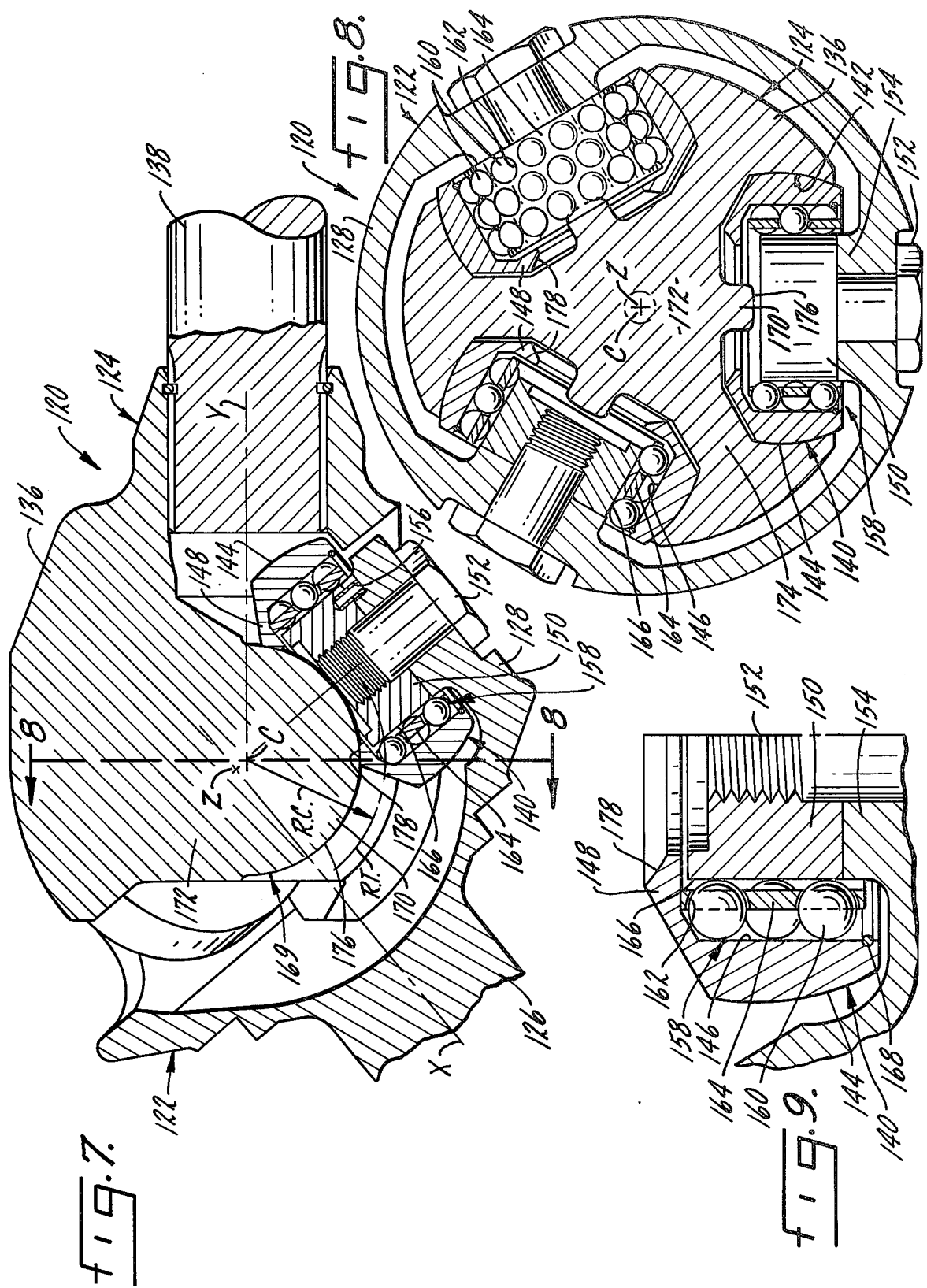

UNIVERSAL JOINT SYSTEM

SUMMARY OF THE INVENTION

THE BACKGROUND

The invention relates to a three-roller type constant velocity universal joint in which three drive rollers are carried by a trunnion member and are engaged in respective drive channels formed in a track member to provide constant velocity universal drive while the axes of the two members are at an angle.

Constant velocity universal joints of the three-roller type are exemplified by applicant's "Constant Velocity Joints," disclosed and claimed in U.S. Pat. No. 2,910,845 issued Nov. 3, 1959. As far as applicant is aware, the joint disclosed in this patent is the first successful three-roller constant velocity joint. Three-roller joints according to the patent have been widely used in hydraulic mechanisms employed in the aerospace industry.

Earlier efforts to provide universal joints of the three-roller type are disclosed, for example, by Kittredge U.S. Pat. No. 2,125,615 issued Aug. 2, 1938, Anderson U.S. Pat. No. 2,235,002 issued Mar. 18, 1941, and Ayer British Pat. No. 143,654 accepted June 3, 1920.

Subsequent to disclosure of applicant's joint in U.S. Pat. No. 2,910,845 other three-roller joints of the same character have been successfully employed in the automotive industry as universal joints in the drive trains supplying torque to the driving sheels of automobiles. One such automotive use is disclosed in an article of J. M. Roethlisberger and F. C. Aldrich, entitled "The Tri-Pot Universal Joint," published by the Society of Automotive Engineers pursuant to an engineering congress held in Detroit, Mich., Jan. 13-17, 1969. This article discloses the use of three-roller type universal joints in the front wheel drive systems employed in the Oldsmobile Toronado and Cadillac El Dorado automobiles. Similar three-roller joints of a French company, Glaenzer Spicer S.A., are depicted in Orain U.S. Pat. No. 3,125,870 issued Mar. 24, 1964, versions of which have reportedly been used in certain Peugot (French) and SAAB (Swedish) automobiles.

To applicant's knowledge, he was the first to recognize and to successfully accommodate the relative "weaving" or "orbiting" of the centers of the two joint members of a three-roller joint as the members are rotated with their axes at an angle. In applicant's three-roller joints according to his U.S. Pat. No. 2,910,845 and in subsequent successful three-roller joints, weaving or orbiting has been accommodated by making the drive rollers slidable on trunnions fixed at right angles to the axis of the one joint member while confining and controlling the positions of the rollers in the respective drive channels in the other joint member. The peripheral surfaces of the drive rollers of such joints are spherical or spheroid in order to permit the trunnions carrying the rollers to tilt universally relative to the side surfaces of the drive channels as the joints are rotated with the axes of the two members at an angle.

A three-roller type joint which accommodates relative weaving or orbiting of the joint centers through a different principle of operation is disclosed in applicant's copending patent application entitled "Improved Constant Velocity Universal Drive," U.S. Ser. No. 289,585, filed Sept. 15, 1972.

The Invention

The universal joint of this invention is of the type disclosed in applicant's U.S. Pat. No. 2,910,845 in that the drive rollers are axially shiftable on their respective trunnions while the positions of the rollers are controlled by means provided in the track member. Applicant accommodates the required rotation and axial shifting of the drive rollers on their respective trunnions by means of a unique two-way antifriction bearing. The result is a constant velocity universal joint which is smaller in size than previous three-roller joints of this type but which provides increased torque carrying capacity while still reducing friction and at the same time permitting increased joint angularity.

The improved two-way antifriction bearing is disposed in the annular space between each of the drive rollers and its associated trunnion. In its simplest form the two-way bearing comprises a plurality of ball bearings disposed between the outer cylindrical surface of the trunnion (acting as an inner race) and the opposed inner cylindrical surface of the drive roller (acting as the outer race). The ball bearings are positively spaced as close as possible in staggered annular rows by means of an annular retainer member having a plurality of apertures receiving the individual balls. The spacing between the inner race and the outer race is slightly smaller than the diameter of each of the balls in order to provide a preloading which increases the load carrying capacity and eliminates all play.

A compound version of the two-way antifriction bearing incorporates a separate annular bearing sleeve spaced between the trunnion and the inner surface of each of the drive rollers, with a plurality of needle rollers disposed between the trunnion and the inner surface of the bearing member to accommodate rotation. A plurality of barrel shaped rollers, disposed between the outer surface of the annular bearing member and the inner surface of the drive roller in a plurality of circumferentially spaced rows, accommodates axial shifting of the drive roller. The respective spaces between the inner surface of the drive roller and the outer surface of the trunnion and the opposed surfaces of the annular bearing member are slightly smaller than the combined radial depth of the respective barrel rollers and needle rollers to provide a preloading of these elements to increase load carrying capacity and to eliminate play.

While the unique two-way antifriction bearing is especially important for use in the universal joint of this invention, it is also adaptable for use in any comparable machine environment requiring totally antifriction support for a rotatable and axially shiftable machine element.

When the joint of the present invention is utilized in an application requiring relative axial shifting between the two members of the joint, an additional advantage is provided. Applicant has discovered an optimum range of the ratio between the roller torque arm of the trunnion member and the radius of curvature of the drive tracks in the track member in order to achieve minimum joint overall size, maximum joint axial travel and maximum joint angle (the torque arm is defined as the distance between the axis of the trunnion member and the spherical center of each of the drive rollers when the axes of the trunnion member and the track member are aligned, that is, at zero joint angle). The optimum ratio of torque arm to track radius lies in a range between 0.75 and 0.90 in order to provide the best compromise for achieving maximum axial travel while still permitting maximum joint angularity in a joint of minimum size and maximum torque capacity.

In the fixed-center (or non-axial-travel) embodiment of the invention, the track radii are equal to the torque arm. The track member carries a centering device which is provided with segmental spherical surfaces which engage complementary segmental spherical surfaces formed at the inner ends of the drive rollers. The centering device is positive in its action and accurately locates the joint members with respect to one another, and yet it does not in any way restrict or impede the relative weaving of the axes as the members rotate while at an angle. Sufficient clearance is provided between the centering device surfaces and the ends of the trunnions to accommodate the maximum orbiting or weaving between the joint axes at maximum joint angle.

The axial-travel and fixed-center embodiments of the universal joint of this invention are well-suited for use as the inner and outer universal joints of an automotive front wheel drive system as described in applicant's previously mentioned copending patent application, U.S. Ser. No. 289,585.

BRIEF DESCRIPTION OF THE DRAWINGS

The invention is illustrated in the following drawings in which:

FIG. 1 is a generally schematic front view of a universal joint system, such as used in automotive front wheel drive, employing universal joints according to the present invention, with an axial-travel embodiment shown on the right and a fixed-center embodiment shown on the left);

FIG. 2 is an enlarged longitudinal sectional view of the axial-travel joint embodiment of FIG. 1, depicting the joint members with their axes disposed at a relatively large angle and with the members at substantially maximum outward axial travel;

FIG. 3 is a transverse sectional view, with some parts in elevation, taken along line 3—3 of FIG. 2;

FIG. 4 is a sectional view taken along line 4—4 of FIG. 2 and showing another view of the two-way bearing mounting the drive rollers on the trunnions for rotation and axial shifting;

FIG. 7 is an enlarged longitudinal sectional view of the fixed-center joint of FIG. 1, depicting the joint members with their axes disposed at a relatively large angle and also illustrating another embodiment of two-way bearing for mounting the drive rollers on the trunnions for rotation and axial shifting;

FIG. 8 is a transverse sectional view, with some parts in elevation, taken along line 8—8 of FIG. 7 but depicting the joint at zero angle; and FIG. 9 is a further enlarged fragmentary sectional view of the second embodiment of two-way bearing as shown in FIGS. 7 and 8.

Figure 5:
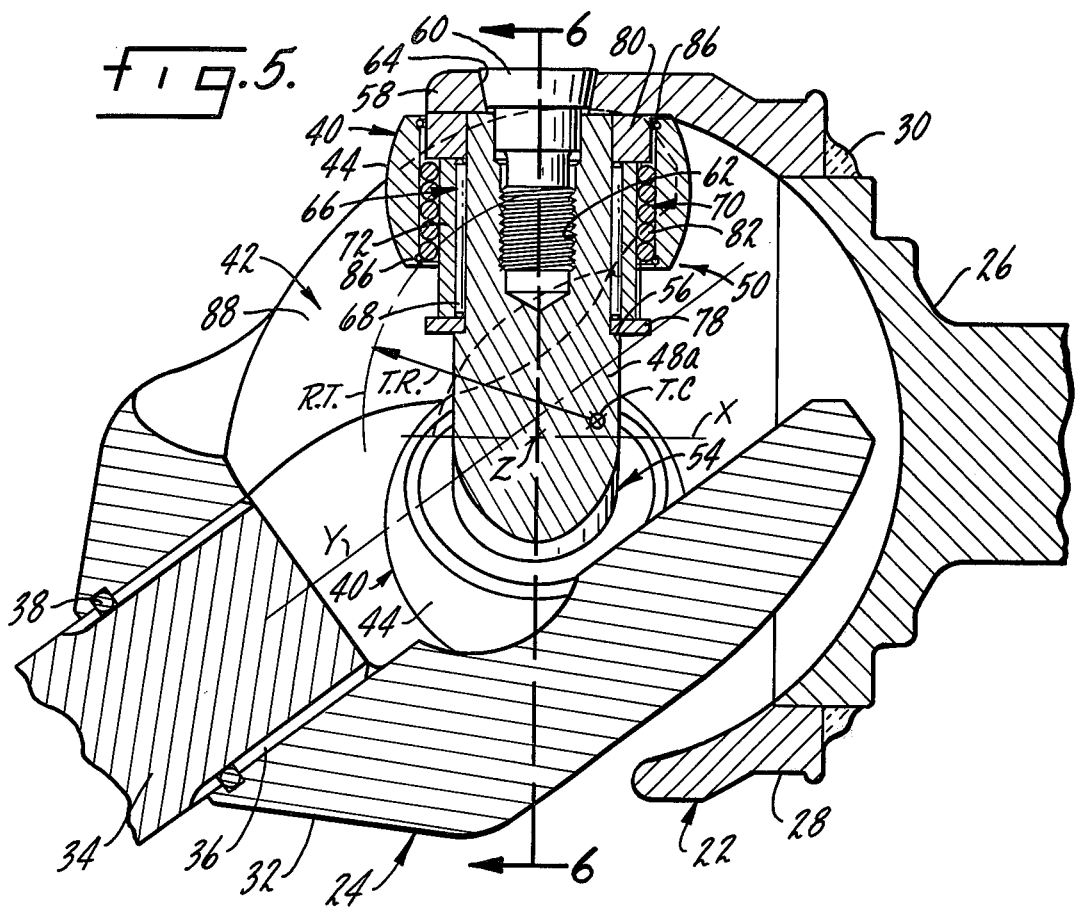
FIG. 5 is a longitudinal sectional view similar to FIG. 2 but showing the joint rotated 60° (in either direction) and with the joint members at substantially maximum inward axial travel.

DETAILED DESCRIPTION
Preface

The three-roller type constant velocity universal joint of the present invention provides constant velocity drive from one joint member to the other member regardless of the joint angle up to the maximum angle permissible. Both embodiments of universal joints of this invention employ spherically surfaced drive rollers and curved cylindrical tracks in the track member for controlling the positions of the drive rollers as the joint rotates with the members at an angle. The joints of the present invention are an improvement over the prior art type of joint as disclosed in connection with applicant's earlier U.S. Pat. No. 2,910,845 and subsequent joints of the same character as identified previously in the summary of this invention.

FIG. 1 diagrammatically illustrates a universal drive system 10 which includes two constant velocity universal joints of the three-roller type according to the present invention, an axial-travel type joint 20 at one end and a fixed-center typed joint 120 at the other end. The particular universal drive system might be utilized as one side of an automotive front wheel drive system, for example, in which the fixed-center joint 120 has one of its joint members connected to the differential gearing (not shown) of an automobile which in turn is driven through an automobile engine and a transmission system (not shown). The other joint member of the joint 120 is connected by means of a suitable shaft or the like to one joint member of the axial-travel type joint 20 which in turn has its other joint member connected to one of the steerable driving wheels 21 of an automobile or other automotive vehicle. Such a front wheel drive system is described in more detail, for example, in applicant's previously identified copending patent application Ser. No. 289,585.

An alternative use for a joint system 10 as depicted in FIG. 1 might be in a swash plate type hydraulic mechanism as depicted in applicant's U.S. Pat. No. 2,910,845 or in any other drive mechanism requiring constant velocity universal drive.

The joint and two-way bearing embodiment of FIGS. 2–6

The constant velocity universal joint 20 includes two major portions, a trunnion member 22 having a rotational axis X and a track member 24 having a rotational axis Y. Either the trunnion member 22 or the track member 24 may be used as the drive member of the joint with the other acting as the driven member. In this specification and in the claims the term "joint angle" means the angle between the axis of the trunnion member and the axis of the track member. The term "plane of the joint" or "joint plane" refers to the plane defined by the axes X and Y of the trunnion member and the track member when these axes are disposed at some joint angle other than 0°.

As will be described in more detail, the trunnion member 22 and the track member 24 are drivingly interconnected so that when rotated with their axes at any angle up to the maximum permissible, the angular velocities of the two members are always exactly the same regardless of the position in a rotational cycle of 360°, or in other words, the joint transmits "constant velocity" drive. The necessity for and the advantages of constant velocity drive are explained in more detail, for example, in applicant's copending application Ser. No. 289,585.

The trunnion member 22 of the joint 20 includes a shaft section 26 and a trunnion carying section 28, both formed of tough metals such as forged steel and welded together at 30.

The track member 24 of the joint includes a track section 32 and a shaft section 34, both formed of tough metals. The two sections are fixedly secured to one another by means of interengaging splines 36 and a conventional lock ring 38.

The shaft sections 26 and 34 of the trunnion member 22 and the track member 24, respectively, are connected in any sutiable manner to the cooperating portions of the mechanism with which the joint 20 is to be utilized.

The constant velocity drive interaction between the trunnionn member 22 and the track member 24 is provided through three drive rollers 40 which are carried by the trunnion member and which engage in respective drive channels or tracks 42 formed in the track member.

Each of the drive rollers 40 is of annular, ringlike configuration with a generally spherical or spheroid outside peripheral surface 44 and an inside cylindrical surface 46. The center of the spherical surface 44 of each of the drive rollers is located on the axis of the internal cylindrical surface 46. The drive rollers 40 are preferably formed of a tough metal such as high-grade steel which may be suitably hardened or surface hardened to provide stable, long wearing qualities for the spherical surfaces 44 and the cylindrical surfaces 46.

The drive rollers 40 are rotatably and axially shiftably mounted on three trunnions 48, carried by the trunnion member 22, by means of twoway antifriction bearing assemblies 50 according to the present invention. The trunnions have their axes equiangularly spaced and define a plane which is perpendicular to the axis X of the trunnion member. While the trunnions are identical and are collectively identified by the reference numeral 48, for convenience of understanding of joint operation they are individually identified as 48a, 48b and 48c as shown in FIGS. 2–6. The trunnions 48 are preferably formed of tough metal such as high-grade steel and each is provided with a cylindrical bearing surface 52 which may be suitably hardened or surface hardened. Although the trunnions could be separately formed and secured to trunnion member 22, to provide additional strength and stability they are formed as integral end portions of a three fingered spider 54. The junctures between the trunnions 48 and the spider 54 are defined by annular shoulders 56 which serve as stops for the two-way bearing assemblies 50.

The trunnions 48 are fixedly secured at their radially outward ends against three axially extending fingers or lugs 58, which are formed as integral extensions of the trunnion carrying portion 28, by means of tap screws 60 which are threadedly secured in tapped holes 62 which are formed radially inwardly along the axes of the respective trunnions. The screws 60 are provided with frustoconical heads which engage in mating tapered holes 64 formed in each of the finger-like extensions 58.

Each of the two-way bearing assemblies 50 comprises an inner antifriction needle-type radial bearing assembly 66, including a plurality of needle bearing members 68, and an outer antifriction axial-type bearing assembly 70. The two bearing assemblies 66 and 70 are separated by an annular bearing member 72 which has an inner cylindrical surface 74 forming the outer race for the needle bearing assembly 66. The inner race of the needle bearing assembly is formed by the cylindrical bearing surface 52 of the respective trunnions 48. Each bearing member 72 is rotatably disposed between an inner thrust washer 78 bottomed against the annular shoulders 56 and an outer thrust washer 80 disposed against the inner surface of each of the finger-like extensions 58. The needle bearing members are slightly shorter than the distance between the opposed surfaces of the washers 78 and 80, so that the bearing member 72 is rotatably supported in antifriction radial bearing fashion by the needle bearing assembly 66.

Each of the axial-type antifriction assemblies 70 includes a plurality of tapered or barrel-shaped roller bearings 82 arranged end-to-end in five generally annular rows about the outer peripheral portion of the annular bearing member 72. The barrel-shaped rollers 82 are disposed in groups of five in conforming axial grooves 84 formed in the outer peripheral surface of the annular bearing member 72. The grooves 84 thus form a plurality of longitudinal inner races for groups of five of the barrel-shaped rollers 82. A common axial outer race for all of the barrel-shaped rollers is provided by the cylindrical inner surface 46 of each of the drive rollers 40. It will be noted that the configuration of the rollers 82 is such that in profile they conform to the cylindrical inner surface 46. To complete the bearing assembly 70 a pair of annular split snap rings 86 may be disposed in a pair of conforming grooves formed at the opposite edge portions of the cylindrical bearing surface 46. The snap rings 86 provide means for preventing overtravel of axial movement of the drive rollers 40 since the barrel rollers 82 in the outer rows cannot run past the snap rings.

Thus, the two-way bearing assembly 50 accommodates totally antifriction rotation of the drive rollers 40 through the needle bearing assembly 66 and at the same time provides totally antifriction axial travel of the drive rollers through the barrel roller bearing assembly 70. In order to provide maximum load carrying capacity of each of the composite two-way bearings 50 the maximum diameter of the barrel rollers 82 is slightly larger than the space between the bearing surface 46 and the opposed grooves 84, and the diameter of the needle bearing members 68 is slightly larger than the space between the opposed bearing surfaces 52 and 74, thus providing a bearing preload. Since the two-way bearing is totally antifriction, the bearing preload in no way impedes operation of the joint. In addition to increasing the capacity of the bearings, the preloading provides additional support for the drive rollers and eliminates any tendency of the rollers to wobble on the trunnions.

To complete the constant velocity drive interconnection between the trunnion member 22 and the track member 24, the drive tracks 42 of the track member are each defined by a pair of curved segmental spherical track surfaces 88 which are accurately formed and spaced from one another to closely confine the respective drive rollers 40 with a very slight running clearance. Accordingly, the segmental spherical surface 44 of each of the associated drive rollers 40 contacts only one of the opposed drive track surfaces 88 at a time. The drive tracks are angularly spaced 120° apart to correspond to the angular spacing of the trunnions 48 of the trunnion member 22.

The drive tracks 42 are generated from a center which is offset from the axis Y of the track member 24. The track center, designated TC in FIGs. 2 and 5, is offset beyond the axis Y with respect to each of the drive tracks 42, so that the track radius TR of each drive track is larger than it would be if the track radius were generated from a point located on the axis Y. The curved centerline marked RT in FIGS. 2 and 5 is actually the path of the center of a circle which generates the surfaces 88 of the drive tracks as it is swung about a radius from the center TC. Theoretically, the centerline RT is also the path followed by the spherical centers of the drive rollers 40 as the joint is rotated with the joint members 22 and 24 at an angle. As will be seen, the diameter of this generating circle for the drive tracks is substantially equal to the spherical diameter of the segmental spherical surfaces 44 of the drive rollers 40. In practice, of course, the spherical diameter of the drive rollers may be very slightly less and the surfaces 44 may be slightly crowned in the center in order to provide the necessary slight clearance for rolling of the drive rollers against one or the other of the curved track surfaces 88 in the respective drive tracks 42.

If the drive track surfaces 88 were to be generated from a center located on the axis Y of the track member 24, the track radius would be identical to the torque arm, which is defined as the radius about which the effective torque between the drive rollers 40 and the drive tracks 42 is transmitted as the joint is rotated under torque. Applicant has found that for most efficient operation of a three-roller joint of the character described, having the smallest overall diameter possible commensurate with a given torque capacity, the torque arm and the track radius must bear a closely defined relationship to one another. In other words the ratio of torque arm to track radius must be confined within a relatively narrow range in order to provide the best possible compromise between permissible axial travel between the joint members, maximum angle of the joint, and minimum axial shifting of the drive rollers 40 on their respective trunnions. The particular joint which is depicted in the drawings FIGS. 2 and 3 and in FIGS. 5 and 6 has a torque arm of approximately 1.25 inches at a track radius of approximately 1.50 inches. Thus, the ratio of torque arm to track radius of this particular joint is 0.83, or in other words, the torque arm is 83 percent of the value of the track radius. Applicant has found that for most efficient operation in smallest joint size for given capacity the ratio of turque arm to track radius should be maintained within the range of 0.75 to 0.90, or in other words the torque arm should be between 75 percent and 90 percent the value of the track radius. The particular joint described has a maximum diameter of approximately 4⅝ inches utilizing drive rollers with a spherical diameter of approximately 2 inches. The maximum axial travel between the trunnion member 22 and the track member 24 is 0.75 inches at any angle up to the maximum design angle of 37°. At angles less than maximum angle the permissible axial travel is greater, that is, up to approximately one inch at 0° joint angle.

Figure 6:
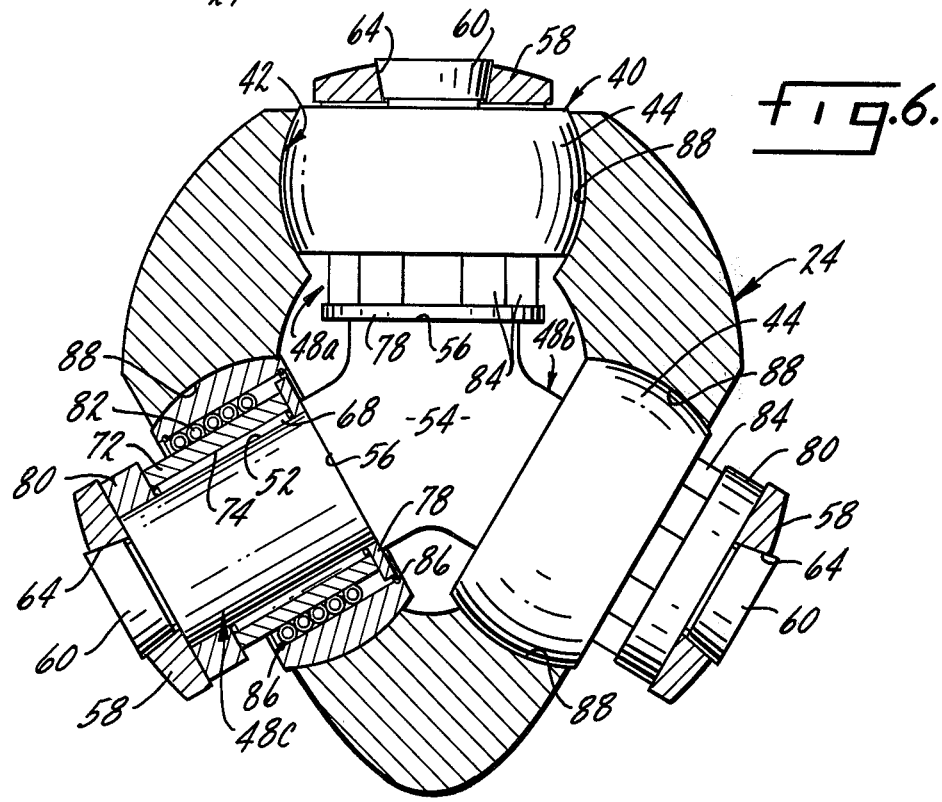
FIG. 6 is a transverse sectional view, with some parts in elevation, taken along line 6—6 of FIG. 5.

The extremes of axial travel of the drive rollers 40 on their respective trunnions are illustrated by comparison of FIGS. 2 and 3 with FIGS. 5 and 6. All three-roller joints require a relative weaving of the shafts, or to put it another way, an orbiting of the joint center as the joint is rotated with the axes of the members at an angle. The orbiting function is the same regardless of whether the three-roller joint is of the character of applicant's original design shown in U.S. Pat. No. 2,910,845, whether it is of the character disclosed and claimed in applicant's copending patent application, Ser. No. 289,585, or whether it is of the character of the present joint having curved drive tracks. The joint center here is arbitrarily chosen as the point of intersection of the axes of the trunnions 48 with the trunnion member axis X, and is designated Z. If the axis Y of the track member 24 is chosen as the weaving axis, this axis will complete three weaving motions about the joint center Z for each 360° rotation of the joint, and the magnitude of weaving will increase geometrically as the joint angle is increased from 0° up to the maximum permissible angle. At the design maximum angle of the particular joint shown in FIGS. 2, 3, 5 and 6, the axis Y weaves or orbits with respect to the joint center Z a maximum displacement of approximately 0.125 inches. The phenomenon of weaving is more particularly explained in applicant's prior copending patent application Ser. No. 289,585.

Orbiting of the joint center and the effect of relative axial travel between the two joint members must be considered in determining the maximum axial shifting of the drive rollers as the joint operates. FIGS. 2 and 3 illustrate the maximum outward position of one of the drive rollers, the one carried by the trunnion 48c, when maximum relative axial travel has occurred between the joint members, that is, when the joint is in the maximum out position. As shown, the particular drive roller 40 on the trunnion 48c is at the position of maximum outward travel because it is at the position of maximum orbit outwardly and also at the position of maximum out position resulting from axial movement of the joint members. If the joint 20 is in the particular radial position shown in FIGS. 2 and 3 but the track member 24 is moved toward the trunnion member 22, the drive roller 40 carried by the trunnion 48c will be farther inwardly due to the curvature of the track 42. With the same angular position of the joint as shown in FIG. 2, the two drive rollers 40 carried by the trunnions 48a and 48b are at maximum inward position as shown.

When the joint is rotated 60° clockwise from the position of FIG. 3 to the position of FIG. 6, the drive roller 40 carried by the trunnion 48a is carried to its maximum outward position when the track member 24 is moved inwardly to the other extreme of its axial travel relative to the trunnion member 22.

The drive rollers 40 must travel between the extreme positions as described as the joint is rotated under torque. The particular joint depicted in FIGS. 2-6 in its full size configuration is capable of accommodating approximately 34,000 inch-pounds of torque at any joint angle within the range from 0° to 37°. Thus the constant velocity universal joint 20 of the size and capacity indicated might be used, for example, as the outboard steering joint of an automotive front wheel drive system as described in applicant's prior copending application, Ser. No. 289,585. Such joint would be more than adequate in size, capacity and turning angle for use in a large high-powered automobile. Such automobiles of the front wheel drive type currently utilize Rzeppa type joints for outboard steering joints, which joints do not permit axial travel and hence are limited in their application as described in connection with applicant's above-identified prior application. A typical Rzeppa type joint is described in the SAE article referred to earlier in this specification.

The joint embodiment and two-way bearing embodiment of FIGS. 7–9

The embodiment of three roller-type constant velocity universal joints depicted in FIG. 7–9 is a fixed-center type joint which is particularly useful, for example, as one of the pair of joints on one side of an automotive vehicle employing front wheel drive. The joint of this embodiment is the joint 120 schematically illustrated in FIG. 1. As illustrated in FIGS. 7 and 8, the joint 120 includes a trunnion member 122 and a track member 124.

The trunnion member 122 includes a shaft section 126 and an integrally formed trunnion section 128.

The track member 124 of the joint 120 includes a track section 136 and a shaft section 138. These two sections are affixedly secured to one another in any suitable manner, for example, by the spline and snap-ring construction shown in FIG. 7.

As is the case with respect to the universal joint 20 of the embodiment of FIGS. 2–6, the constant velocity drive interconnection between the trunnion member 122 and the track member 124 is afforded through three drive rollers, here designated 140, which are engaged in respective drive channels or tracks 142 formed in the track member 124.

Each of the drive rollers 140 is of annular, ring-like configuration with a generally spherical or spheroid outside peripheral surface 144 and an inside cylindrical surface 146. The center of the spherical surface 144 of each of the drive rollers is located on the axis of the internal cylindrical surface 146. An integral annular stop flange 148 is formed on each of the drive rollers 140. As is the case with the rollers 40 of the previous embodiment, the drive rollers 140 are constructed of tough metal and are surfacehardened at the surfaces 144 and 146 if desired.

The drive rollers 140 are rotatably and axially shiftably mounted on three trunnions 150 which are secured to the trunnion member by means of respective cap screws 152 which pass through internal bosses 154 formed in the trunnion carrying portion 128. The cap screws have threaded portions which are threadedly secured in mating threaded apertures in the respective trunnions 150 as shown. To positively prevent rotation of the trunnions 150, lock pins 156 may be disposed in close fitting opposed apertures in the trunnions and the bosses 154.

The drive rollers 140 are rotatably and axially shiftably mounted on the trunnions 150 by means of a second embodiment of two-way antifriction bearing assemblies 158. Each of the two-way bearing assemblies 158 comprises a plurality of ball bearings 160 carried in loose-fitting apertures 162 in an annular ball bearing cage member 164. The ball bearing 160 and the apertures 162 are arranged in three circumferential rows with the balls and apertures alternately staggered as shown to permit the use of a maximum number of balls for maximum load carrying capacity. The ball bearings 160 are disposed in the annular space between the inner cylindrical bearing surface 146 of the drive roller 140 and an outer cylindrical bearing surface 166 of the trunnion 150, with the diameter of the balls 160 being slightly greater than the radial dimension of the annular space in order to provide a bearing preload. To provide a stop for the bearing assembly 158 a snap ring 168 is disposed in a mating annular groove formed in the internal cylindrical surface 146 near the end opposite the integral annular stop flange 148. The annular flanges 148 limit movement of the cage 164 in one direction as shown in FIG. 9, and the snap ring 168 engages the outer row of ball bearings 160 to prevent over travel of the bearings in the other direction. The two-way bearing assemblies 158 provide totally antifriction rotation of the drive rollers 140 and also provide totally antifriction axial shifting of the drive rollers 140 with respect to the trunnions 150.

The fixed center joint 120 incorporates a centering mechanism 169 which positively prevents relative axial travel between the trunnion member 122 and the track member 124 without in any way impeding proper rotation of the joint. The centering mechanism includes three centering ribs 170 which are integrally formed on a centering spider 172 which in turn is secured by three equiangularly spaced rib members 174 within the track member 124. The ribs 174 may be integrally formed with the track member and are spaced between the track 142 as seen in FIG. 8. Each of the centering ribs 170 is provided with a segmental sperical or ball-like surface 176 having a common center C located on the axis Y of the track member 124. The segmental spherical centering surfaces 176 are conformingly associated with complimentary segmental spherical socket-like surfaces 178, which comprise a part of the centering mechanism 169, formed on the inwardly facing ends of the annular flanges 148 of the drive rollers 140. The segmental spherical socket-like surfaces 178 have a common center at the center of the joint, designated Z, which is defined as the point on the axis X of the trunnion member 22 at which the axes of the three trunnions 150 intersect.

If the shaft 126 of the trunnion member 122 is taken as the non-weaving member, which is the arrangement depicted in FIG. 1, then the axis Y of the track member 124 weaves with respect to the joint center Z as the joint 120 is rotated with the respective axes at some angle other than zero degrees. This means that the center C of the centering spider in 172 must orbit with respect to the joint center Z. The arrangement is such that the orbiting causes the drive rollers 140 to shift axially on their trunnions 150 and this shifting is exactly coordinated with the orbiting.

It will be seen that with the joint 120 of the embodiment of FIGS. 7–9 the roller track radius RT, that is the path followed by the centers of the generating circles for the drive tracks 142, must be equal to the torque arm as defined in connection with the embodiment of FIGS. 2–6. Otherwise, the joint could not operate with the centering mechanism 169 as described.

In order to compensate for the very slight lack of exact spherical coordination between the ball-like surfaces 176 and the socket-like surfaces 178, the surfaces 176 may be made spheroid rather than perfectly spherical. The degree to which this is necessary can be seen by reference to FIG. 8 which shows a transverse cross-sectional view of the joint with the joint members at zero angle in which case the joint center Z and the center C centering spider 172 coincide. If the joint were operating at maximum angle, however, the center C would orbit with respect to the joint center Z in a path similar to that shown in dotted lines in FIG. 8. It will be understood that as the joint rotates with the joint members at an angle, the weaving of the shaft Y with respect to the joint center Z is exactly compensated for by in and out movement of the drive rollers 140 on their trunnions 150. The lack of spherical coordination between the centering member center C and the joint center Z must be compensated for to the extent of the maximum amount of angular deviation between the trunnion axes and the radii of the ball surfaces 176, a matter of two or three degrees at the most as can be seen from observation of FIG. 8.

It will be seen therefore that the centering mechanism 169 acts to positively affix the axial position of the track member 124 with respect to the center Z of the joint, hence the descriptive term, "fixed-center joint." The term should not be understood to imply that there is no orbiting or weaving of one of the shafts since this is required in all three-roller type universal joints and occurs in the same manner in the fixed-center joint 120.

Both the axial-shift embodiment of FIGS. 2–6 and the fixed-center embodiment of FIGS. 7–9 utilize the two-way antifriction bearing concept of the present invention in which both rotation and axial shifting of the drive rollers is totally antifriction, without any backlash and with high load carrying capacity. The choice as to whether to use the composite type of two-way bearing such as the bearing 50 or the simplified bearing 158 is a matter of choice depending upon the maximum load and the space available. Both perform the same advantageous functions and make possible the joints of the present invention. Also it should be noted that the unique two-way antifriction bearing concept of this invention is adaptable for use in any similar machine environment where high load carrying capacity combined with totally antifriction rotation and axial shifting of a machine element are important.

Modifications and variations may be effected without departing from the scope of the novel concepts of the present invention.

I claim:

1. In a constant velocity universal joint of the three-roller type including a trunnion member having three trunnions each carrying an axially shiftable drive roller and also including a track member having three drive tracks confining and controlling the axial positions of the drive rollers on the respective trunnions, with the rollers disposed in driving engagement with drive surfaces in the respective drive tracks, the improvement comprising two-way antifriction bearing means rotatably and axially shiftably mounting said rollers on the respective trunnions, whereby said antifriction bearing means provide totally antifriction support for said rollers as they rotate and shift axially on said trunnions to accommodate relative weaving of the axes of said members when the joint is rotated with the axes of the members angularly disposed, each of said bearing means including:
   a. inner and outer annular bearing races formed on the respective roller and trunnion, and
   b. a plurality of spherical antifriction members annularly disposed in rolling preloaded bearing fashion between said inner and outer races and arranged to accommodate both rotation and axial shifting of said roller on said trunnion by rolling of said spherical antifriction members between said races.

2. A constant velocity universal joint according to claim 1 in which said races of said bearing means are cylindrical and are annularly spaced by said spherical antifriction members.

3. A constant velocity universal joint according to claim 2 in which said bearing means include:
   a. a removable stop ring secured to one of said races at on end thereof,
   b. whereby at least one of said spherical antifriction members is engageable with said stop ring to limit axial travel of the bearing means in one direction.

4. In a constant velocity universal joint of the thre-roller type including a trunnion member having three trunnions each carrying a drive roller at an average torque arm distance from the axis of the trunnion member, the improvement comprising:
   a. a track member having three drive tracks confining and controlling the axial positions of the drive rollers on the respective trunnions,
   b. each of said tracks being formed on an arc having a radius such that the ratio of the average torque arm distance to the track radius lies in a range between 0.75 and 0.90.

5. A constant velocity universal joint according to claim 4 in which each of said drive rollers is formed with a segmental generally sperical outer surface and each of said drive tracks is formed with segmental surfaces generated by a circle having a diameter substantially the same as the diameter of the spherical surfaces on said rollers.

6. In a constant velocity universal joint of the three-roller type including a trunnion member having three trunnions each carrying an axially shiftable drive roller and also including a track member having three drive tracks confining and controlling the axial positions of the drive rollers on the respective trunnions with each of said tracks being generated on an arc having a common center at the axis of the track member, the improvement comprising centering mechanism for preventing relative axial shifting between said members, including:
   a. a centering device fixedly secured to said track member radially inwardly of said drive tracks and having three generally sperical centering surfaces with a common center at the aforementioned common center, and
   b. a segmental generally spherical socket formed on each of said drive rollers and having a radius substantially equal to the radius of each of said centering surfaces,
   c. whereby said centering surfaces are universally engaged with said spherical sockets on said drive rollers to prevent relative axial shifting between said members while still accommodating relative weaving of the axes of said members when the joint is rotated with the axes of the members angularly disposed.

7. In a constant velocity universal joint including at least one drive element carried by a trunnion, the improvement comprising two-way antifriction bearing means rotatably and axially shiftably mounting said drive elements on said trunnion, including:
   a. inner and outer annular bearing races formed on the respective drive element and trunnion, and
   b. a plurality of antifriction members annularly disposed in rolling preloaded bearing fashion between said inner and outer races and arranged to accommodate both rotation and axial shifting of said drive element on said trunnion by rolling of said antifriction members between said races, said antifriction members of said bearing means being spherical.

8. A constant velocity universal joint according to claim 7 in which each of said spherical antifriction members is carried in a loose-fitting aperture in an annular cage member.

9. A constant velocity universal joint according to claim 8 in which said loose-fitting apertures in said annular cage member are arranged in a plurality of circumferential rows.

10. A constant velocity universal joint according to claim 9 in which said loose-fitting apertures in said annular cage members are alternately staggered in adjacent circumferential rows.

* * * * *